United States Patent
Leung et al.

(10) Patent No.: US 10,476,283 B2
(45) Date of Patent: Nov. 12, 2019

(54) BI-DIRECTIONAL CHARGER FOR BATTERY DEVICE WITH CONTROL LOGIC BASED ON SENSED VOLTAGE AND DEVICE TYPE

(71) Applicant: INTEL CORPORATION, Santa Clara, CA (US)

(72) Inventors: Patrick K. Leung, Hillsboro, OR (US); Chee Lim Nge, Bukit Mertajam (MY); Tod F. Schiff, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 8 days.

(21) Appl. No.: 14/040,278

(22) Filed: Sep. 27, 2013

(65) Prior Publication Data
US 2015/0091497 A1    Apr. 2, 2015

(51) Int. Cl.
*H02J 7/00*    (2006.01)

(52) U.S. Cl.
CPC .......... *H02J 7/0029* (2013.01); *H02J 7/0052* (2013.01); *H02J 7/0065* (2013.01); *H02J 2007/0059* (2013.01); *H02J 2007/0062* (2013.01)

(58) Field of Classification Search
CPC ......... H02J 7/0029; H02J 7/0052; H02J 7/007
USPC ................................................. 320/107, 137
See application file for complete search history.

(56) References Cited

U.S. PATENT DOCUMENTS

| | | | | |
|---|---|---|---|---|
| 4,233,553 A | * | 11/1980 | Prince, Jr. ............... | H02J 7/008 320/146 |
| 5,442,274 A | * | 8/1995 | Tamai .................. | H02J 7/0093 320/146 |
| 5,539,298 A | * | 7/1996 | Perkins ................. | H02J 7/0004 320/106 |
| 5,587,644 A | * | 12/1996 | Masaki ................ | H05B 41/325 320/166 |
| 5,818,203 A | * | 10/1998 | Narita .................... | H01M 10/44 320/128 |
| 5,872,444 A | * | 2/1999 | Nagano ................. | H02J 7/0073 320/106 |
| 5,963,015 A | * | 10/1999 | Lee ........................ | H02J 7/0068 320/128 |
| 6,087,810 A | * | 7/2000 | Yoshida ................ | H02J 7/0073 320/139 |

(Continued)

FOREIGN PATENT DOCUMENTS

| | | |
|---|---|---|
| CN | 202127260 | 1/2012 |
| CN | 102577018 | 7/2012 |
| CN | 103036274 | 4/2013 |

OTHER PUBLICATIONS

"What are the advantages of portable memory chips?" Boolean_z, Yahoo Answers, Published 2006, Accessed Aug. 11, 2013, https://answers.yahoo.com/question/index?qid=20060712070950AArkdlx.*

(Continued)

*Primary Examiner* — Robert Grant
*Assistant Examiner* — John T Trischler
(74) *Attorney, Agent, or Firm* — Schwabe, Williamson & Wyatt, P.C.

(57) ABSTRACT

A bi-directional charger may be provided that includes a logic, at least a portion of which is hardware, to determine an operational mode based at least on a characteristic at a battery port or at a charge port, and to control power flow between the charge port and the battery port based on the determined operational mode.

22 Claims, 4 Drawing Sheets

(56) References Cited

U.S. PATENT DOCUMENTS

| | | | | |
|---|---|---|---|---|
| 6,127,801 A * | 10/2000 | Manor | H01M 2/1055 | 307/66 |
| 6,281,595 B1 * | 8/2001 | Sinha | F01D 15/10 | 290/40 A |
| 6,344,733 B1 * | 2/2002 | Crass | H02J 7/0086 | 320/143 |
| 6,894,461 B1 | 5/2005 | Hack et al. | | |
| 7,102,251 B2 * | 9/2006 | West | H02J 7/35 | 307/64 |
| 7,348,767 B2 * | 3/2008 | Hack | G05F 1/70 | 323/316 |
| 7,378,818 B2 * | 5/2008 | Fowler | B60L 11/185 | 320/108 |
| 7,402,981 B2 * | 7/2008 | May | H02J 7/0068 | 320/137 |
| 7,486,046 B2 * | 2/2009 | Chou | H02J 7/0065 | 320/107 |
| 7,508,162 B2 * | 3/2009 | Lippojoki | H02J 7/0054 | 320/103 |
| 7,538,532 B2 * | 5/2009 | Hack | G05F 1/70 | 323/284 |
| 7,545,120 B2 * | 6/2009 | Breen | H02J 7/022 | 320/111 |
| 7,566,993 B2 * | 7/2009 | May | H02J 1/08 | 307/82 |
| 7,663,342 B2 * | 2/2010 | Kimball | H02J 1/102 | 320/132 |
| 7,733,060 B2 * | 6/2010 | Kojima | H02J 7/0011 | 320/125 |
| 7,770,036 B2 * | 8/2010 | Dorogusker | G06F 1/263 | 320/106 |
| 7,848,527 B2 * | 12/2010 | Dorogusker | G06F 1/30 | 381/124 |
| 7,863,856 B2 * | 1/2011 | Sherman et al. | 320/103 | |
| 7,915,866 B2 * | 3/2011 | Baker | H02J 7/022 | 320/166 |
| 7,932,633 B2 * | 4/2011 | King | B60L 11/123 | 180/165 |
| RE42,611 E * | 8/2011 | Liscio | A61B 5/0046 | 320/103 |
| 8,143,856 B2 * | 3/2012 | Andrea | H02M 7/797 | 320/109 |
| 8,159,181 B2 * | 4/2012 | Greyling | 320/107 | |
| RE43,572 E * | 8/2012 | West | H02J 7/35 | 307/64 |
| 8,441,228 B2 * | 5/2013 | Brabec | B60L 11/1861 | 180/65.21 |
| 8,443,215 B2 * | 5/2013 | Kung | G06F 1/266 | 320/128 |
| 8,536,840 B2 * | 9/2013 | Walter | H02J 7/0068 | 323/223 |
| 8,593,113 B2 * | 11/2013 | Baker | H02J 7/022 | 320/166 |
| 8,593,115 B2 * | 11/2013 | Walter | H02M 3/1582 | 323/222 |
| 8,615,089 B2 * | 12/2013 | Dorogusker | G06F 1/30 | 330/51 |
| 8,653,696 B2 * | 2/2014 | King | B60L 11/123 | 307/82 |
| 8,698,450 B2 * | 4/2014 | Yeh | H02J 7/025 | 320/108 |
| 8,729,853 B2 * | 5/2014 | Yeh | H02J 7/0034 | 320/108 |
| 8,816,641 B2 * | 8/2014 | Andrea | H02M 7/797 | 320/111 |
| 8,866,438 B2 * | 10/2014 | Lee et al. | 320/109 | |
| 8,896,263 B2 * | 11/2014 | Riggio | H02J 7/00 | 320/104 |
| 8,988,039 B2 * | 3/2015 | Carletti | H02M 1/4225 | 320/107 |
| 9,013,066 B2 * | 4/2015 | Kojori | H01M 10/46 | 307/82 |
| 9,024,573 B2 * | 5/2015 | King et al. | 320/107 | |
| 9,030,171 B2 * | 5/2015 | Wu | H02J 7/0003 | 320/137 |
| 9,065,349 B2 * | 6/2015 | Chiang | H02M 3/337 | |
| 9,099,938 B2 * | 8/2015 | Ilic | H02M 7/72 | |
| 9,102,241 B2 * | 8/2015 | Brabec | B60L 11/1861 | |
| 9,112,374 B2 * | 8/2015 | Ivanov | H02M 7/219 | |
| 9,118,193 B2 * | 8/2015 | Yeh | H02J 7/0029 | |
| 9,160,194 B2 * | 10/2015 | Kung | H02J 7/0072 | |
| 9,199,543 B2 * | 12/2015 | Brabec | B60L 11/1861 | |
| 9,219,380 B2 * | 12/2015 | Yeh | H02J 50/10 | |
| 9,246,348 B2 | 1/2016 | Solie | | |
| 9,261,934 B2 * | 2/2016 | Uan-Zo-Li | G06F 1/263 | |
| 9,391,467 B2 * | 7/2016 | Zhao | H02J 7/0081 | |
| 9,413,262 B2 * | 8/2016 | Yang | H02M 7/04 | |
| 9,548,620 B2 * | 1/2017 | Hu | C02F 1/4691 | |
| 9,570,938 B2 * | 2/2017 | Zilberberg | H02J 9/06 | |
| 9,584,047 B2 * | 2/2017 | Frohman | H02M 7/797 | |
| 9,620,974 B2 * | 4/2017 | King | B60L 11/123 | |
| 9,667,088 B2 * | 5/2017 | Yeh | H02J 7/0044 | |
| 9,673,638 B2 * | 6/2017 | Bastami | H02J 7/0008 | |
| 9,917,466 B2 * | 3/2018 | Wagner | H02J 7/0085 | |
| 9,941,722 B2 * | 4/2018 | Ivanov | H02M 7/219 | |
| 2004/0062059 A1 * | 4/2004 | Cheng | B60L 11/1814 | 363/17 |
| 2004/0071004 A1 * | 4/2004 | King | H02J 7/0054 | 363/142 |
| 2004/0207366 A1 * | 10/2004 | Sung | H02J 7/35 | 320/140 |
| 2004/0207378 A1 * | 10/2004 | Bucur | H02J 7/0029 | 323/288 |
| 2005/0001595 A1 * | 1/2005 | May | H02J 7/0068 | 320/140 |
| 2005/0040711 A1 * | 2/2005 | West | H02J 7/35 | 307/82 |
| 2005/0194942 A1 * | 9/2005 | Hack | G05F 1/70 | 323/205 |
| 2007/0009770 A1 * | 1/2007 | Takada | H01M 16/006 | 429/9 |
| 2007/0205669 A1 * | 9/2007 | May | H02J 1/08 | 307/82 |
| 2007/0236975 A1 * | 10/2007 | Lippojoki et al. | 363/66 | |
| 2008/0111423 A1 * | 5/2008 | Baker | H02J 7/022 | 307/64 |
| 2008/0164853 A1 * | 7/2008 | Hack | G05F 1/70 | 323/205 |
| 2008/0191663 A1 * | 8/2008 | Fowler | B60L 11/185 | 320/118 |
| 2009/0108677 A1 * | 4/2009 | Walter | H02M 3/1582 | 307/80 |
| 2009/0179612 A1 * | 7/2009 | Sherman et al. | 320/103 | |
| 2009/0325056 A1 * | 12/2009 | Greening | G06F 1/189 | 429/121 |
| 2010/0096926 A1 * | 4/2010 | King et al. | 307/45 | |
| 2010/0125383 A1 * | 5/2010 | Caouette | 701/21 | |
| 2010/0194344 A1 * | 8/2010 | Greyling | H02M 3/157 | 320/128 |
| 2010/0231173 A1 * | 9/2010 | Andrea | H02M 7/797 | 320/137 |
| 2010/0237840 A1 * | 9/2010 | Walter | H02J 7/0068 | 323/282 |
| 2010/0320839 A1 * | 12/2010 | Walter | H02M 3/1582 | 307/43 |
| 2011/0025124 A1 | 2/2011 | Brabec | | |
| 2011/0121653 A1 * | 5/2011 | Hartular | H02J 1/10 | 307/66 |
| 2011/0169449 A1 * | 7/2011 | King et al. | 320/109 | |
| 2011/0215644 A1 * | 9/2011 | Baker | H02J 7/022 | 307/64 |
| 2011/0227543 A1 * | 9/2011 | Ivanov | H02M 7/219 | 320/163 |
| 2012/0176090 A1 * | 7/2012 | Andrea | H02J 7/022 | 320/128 |
| 2013/0038127 A1 * | 2/2013 | King et al. | 307/64 | |
| 2013/0038273 A1 * | 2/2013 | Riggio et al. | 320/107 | |
| 2013/0038288 A1 * | 2/2013 | Yeh | 320/114 | |

(56) References Cited

U.S. PATENT DOCUMENTS

| | | | | |
|---|---|---|---|---|
| 2013/0088203 A1* | 4/2013 | Solie | H02J 7/04 | 320/129 |
| 2013/0147441 A1* | 6/2013 | Lee | B60L 9/005 | 320/167 |
| 2013/0154550 A1* | 6/2013 | Balmefrezol | G06F 1/263 | 320/107 |
| 2013/0155736 A1* | 6/2013 | Ilic | H02M 7/72 | 363/71 |
| 2013/0162201 A1* | 6/2013 | Yeh | H02J 7/025 | 320/108 |
| 2013/0175981 A1* | 7/2013 | Yeh | H02J 7/0034 | 320/108 |
| 2013/0214729 A1* | 8/2013 | Gati | H02J 7/06 | 320/107 |
| 2013/0270116 A1* | 10/2013 | Hu | C02F 1/4691 | 204/661 |
| 2013/0271077 A1* | 10/2013 | Kim | H02J 7/0052 | 320/109 |
| 2013/0307467 A1* | 11/2013 | Carletti | H02M 1/4225 | 320/107 |
| 2013/0307478 A1* | 11/2013 | Boggs et al. | 320/112 | |
| 2014/0009106 A1* | 1/2014 | Andrea | H02H 9/002 | 320/107 |
| 2014/0042813 A1* | 2/2014 | Zilberberg | H02J 9/06 | 307/52 |
| 2014/0097790 A1* | 4/2014 | Yeh | H02J 7/0029 | 320/108 |
| 2014/0145677 A1* | 5/2014 | King | B60L 11/123 | 320/109 |
| 2014/0152249 A1* | 6/2014 | Yeh | H02J 50/10 | 320/108 |
| 2014/0191730 A1* | 7/2014 | Ivanov | H02M 7/219 | 320/145 |
| 2014/0197788 A1* | 7/2014 | Gati | H02J 7/022 | 320/109 |
| 2014/0203761 A1* | 7/2014 | Paparrizos | H02M 3/1582 | 320/107 |
| 2014/0203763 A1* | 7/2014 | Zhao | H02J 7/0081 | 320/107 |
| 2014/0268959 A1* | 9/2014 | Frohman | H02M 7/797 | 363/98 |
| 2014/0292278 A1* | 10/2014 | Wu | H02J 7/0003 | 320/112 |
| 2014/0347005 A1* | 11/2014 | Zhou | H02J 7/007 | 320/107 |
| 2014/0375270 A1* | 12/2014 | Coe | H01M 10/44 | 320/112 |
| 2015/0028808 A1* | 1/2015 | Bernardi | B60L 11/1809 | 320/109 |
| 2015/0069956 A1* | 3/2015 | Hu | H02J 7/0052 | 320/107 |
| 2015/0069958 A1* | 3/2015 | Yang | H02J 7/0052 | 320/107 |
| 2015/0084431 A1* | 3/2015 | Yeh | H02J 7/0044 | 307/104 |
| 2015/0084577 A1* | 3/2015 | Schuessler | 320/101 | |
| 2015/0084579 A1* | 3/2015 | Li | H02J 7/0052 | 320/107 |
| 2015/0091532 A1* | 4/2015 | Kvieska | H02J 7/0052 | 320/137 |
| 2015/0188325 A1* | 7/2015 | Wagner | H02J 7/0085 | 307/31 |
| 2015/0288209 A1* | 10/2015 | Rippel | H02J 7/0055 | 320/107 |
| 2015/0357940 A1* | 12/2015 | Ilic | H02M 7/72 | 307/18 |
| 2016/0049805 A1* | 2/2016 | Ivanov | H02M 7/219 | 320/134 |
| 2017/0057368 A1* | 3/2017 | King | B60L 11/123 | |
| 2018/0183319 A1* | 6/2018 | Akita | H02M 3/155 | |
| 2019/0031125 A1* | 1/2019 | Rozman | B60R 16/033 | |

OTHER PUBLICATIONS

"What's the reason to make power supplies external," Martin and Sharptooth, Stackexchange.com, Published Online Jun. 6, 2011, Accessed Mar. 14, 2018, https://electronics.stackexchange.com/questions/15063/whats-the-reason-to-make-power-supplies-external.*

English language translation of Taiwanese Search Report dated Nov. 25, 2015.

Chinese Office Action for Application 201410756035.8 dated May 3, 2016 (full Chinese text and full English translation).

Chinese Office Action issued in Application 2014107560358 dated Dec. 27, 2016 (full English translation).

* cited by examiner

BI-DIRECTIONAL CHARGER FOR BATTERY DEVICE WITH CONTROL LOGIC BASED ON SENSED VOLTAGE AND DEVICE TYPE

BACKGROUND

1. Field

Embodiments may relate to a bi-directional charger for an electronic device.

2. Background

An electronic device may utilize an internal battery and/or an external power source for power. The electronic device may also be coupled to another electronic device (such as mobile terminal, a tablet, etc.). The electronic device may be coupled to an external device (such as an external power source or another electronic device) via a port such as a Universal Serial Bus (USB) port.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
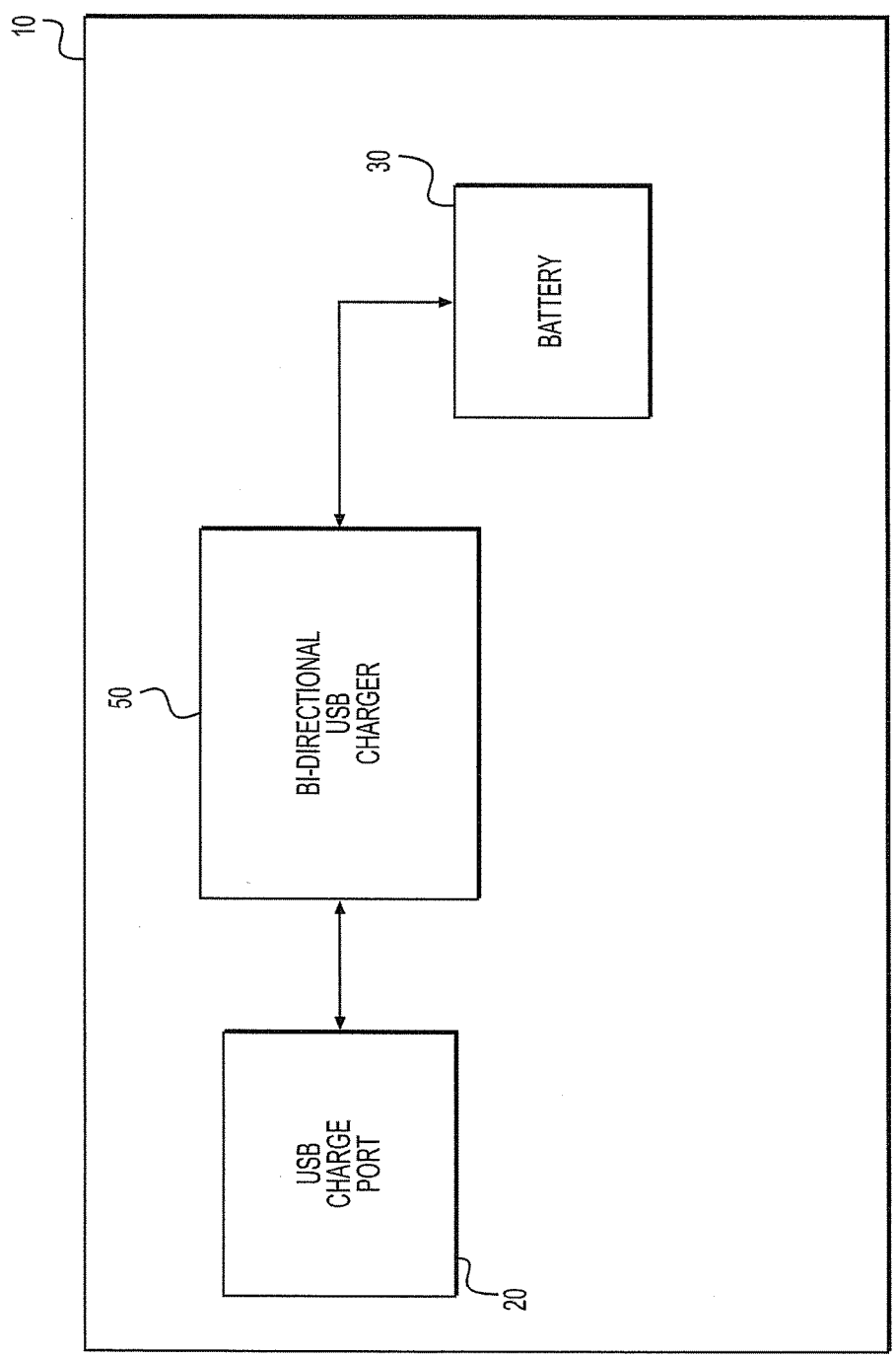
FIG. 1 shows an electronic device according to an example arrangement.

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

An electronic device (or mobile device) may utilize a power source in order to power the electronic device. The electronic device may also be used to power another electronic device.

The electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc.

The electronic device may include a port to receive an input voltage (or power) and/or to provide an output power. The electronic device may include a charger. The charger may include a voltage regulator (of the electronic device) to provide an output voltage to a load. The voltage regulator may provide a regulated output voltage for the load. As one example, the load may be a display device.

The charger may also (or alternatively) provide an output voltage to a battery (provided at the electronic device). The battery may be charged by the voltage received from the charger. The charger may provide an output voltage to the load and/or the battery.

The electronic device may include a port, such as a USB input port, that may receive (or couple to) a power source or a USB device (e.g. a mouse, a keyboard). The electronic device may detect and automatically perform an appropriate action based on the attached device or power source.

The electronic device may utilize Universal Serial Bus (USB) power delivery (PD). The USB PD may provide a burden on a charging system (or other type of charging system) based on different types of operational modes. For example, the USB charge port may couple to any of a plurality of different devices, including a laptop computer and/or a charger.

USB PD may enable functionality of USB by providing flexible power delivery along with data over a single cable. In USB PD, power directions are no longer fixed. This may enable a product with the power (host or client) to provide the power. For example, a display with a power source (i.e., a wall socket) may power or charge a laptop. Alternatively, USB power adaptors (i.e., bricks) or chargers may supply power to laptops and other battery powered devices through USB ports.

The USB charge port may be used to perform various functions such as a laptop computer charging a mobile device (e.g. phone or tablet), a charger (such as a USB charger) charging a laptop computer and/or a USB PD charger to charge a laptop computer. Other types of functions may also be provided.

As one example, a USB charger may have a limit, such as 5 volts and a source current up to 1.5 amp. On the other hand, a USB PD charger may have an extended voltage of 20 volts and current up to 5 amps. Other voltage and current values may also be provided.

Embodiments may relate to bi-directional USB charger (or a bi-directional charger) to charge a host platform and/or to charge client devices. The USB charger may also be called a charging system, a charger or a charger device.

Arrangements and embodiments may utilize features of the USB 2.0 Specification (released in April 2000), the USB 3.0 Specification (released in November 2008), the USB 3.1 Specification (announced on Jul. 31, 2013) and/or the USB Power Delivery Specification 1.0 (issued Jul. 5, 2012).

FIG. 1 shows an electronic device according to an example arrangement. Other arrangements may also be provided. More specifically, FIG. 1 shows an electronic device 10 having a USB charge port 20 (or USB port), a bi-directional USB charger 50 and a battery 30. As one example, a USB charge port may be yellow (in color) and may supply up to 1.5 amps or higher, depending on the host device. With a USB PD charge port, power may flow in either direction, while voltage may be up to 20 volts and current may be up to 5 amps.

An external device such as an electronic device and/or a power source may couple to the USB charge port 20 (or charge port).

The battery 30 may be a battery pack, a battery cell and/or a plurality of battery cells, for example. The battery 30 may be provided at a battery port of the electronic device.

The bi-directional USB charger 50 may be referred to as a bi-directional USB buck-boost charger. The bi-directional charger 50 may provide operations of a buck converter (or voltage step-up converter) and a boost converter (or voltage step-down converter). The bi-directional charger 50 may be considered bi-directional since the charger 50 provides power to the electronic device 10 and provides power from the electronic device 10. The bi-directional charger can operate in a boost configuration or a buck configuration.

The charger 50 may include a full-bridge charging circuit in which power may be provided (or flow) in a first direction (from the charge port 20 to the battery 30) and/or power may be provided (or flow) in a second direction (from internal of the electronic device to the charge port 20). The charger 50 may operate to provide power in both the first and second directions between the battery 30 and the charge port 20. The charger 50 can operate in a buck configuration (or buck mode) or in a boost configuration (or boost mode) in either the first direction or the second direction in order to support various battery pack cell configurations, as well as different USB PD voltages. For example, the charger 50 may operate in a buck configuration to provide a voltage step down (or voltage decrease). The charger 50 may also operate in a boost configuration to provide a voltage step up (or voltage increase).

The charger 50 may choose or determine an appropriate operational mode (or function) based on the charger/device coupled to the charge port 20 and/or a voltage on the internal battery voltage. The charger 50 may provide power based at least on a characteristic of a battery or a device coupled to a charge port. The charger 50 may provide power based at least one a characteristic at a battery port or a charge port.

Figure 2:
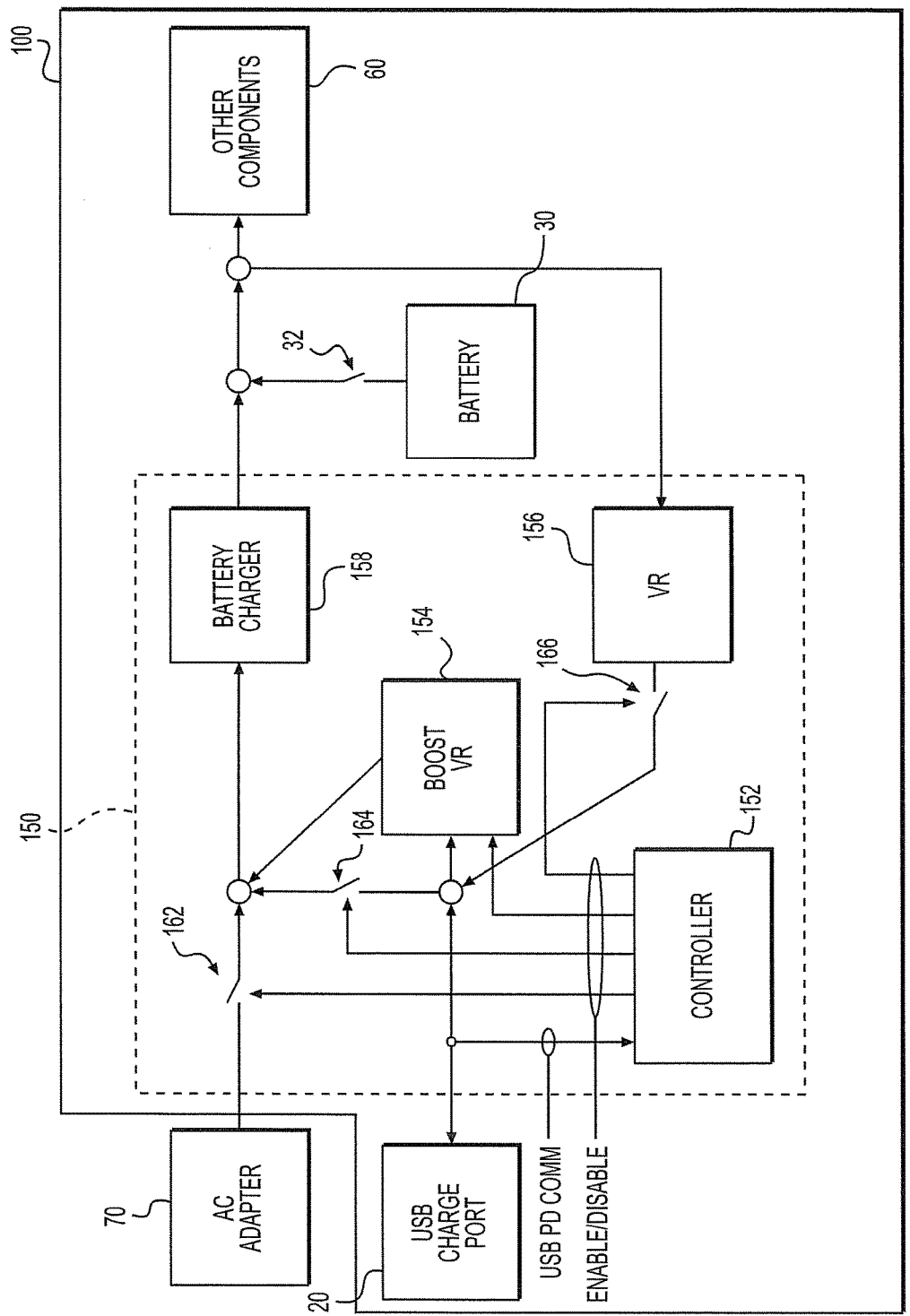
FIG. 2 shows an electronic device according to an example arrangement.

FIG. 2 shows an electronic device according to an example arrangement. Other arrangements may also be provided. More specifically, FIG. 2 shows an electronic device 100 having the USB charge port 20, a USB charger 150, the battery 30, and other components 60 (of the electronic device 100).

FIG. 2 also shows an AC adapter 70 that may considered external to the electronic device 100 in at least one embodiment. The AC adapter 70 may also be part of the electronic device 100 in at least one embodiment.

The other components 60 may be a load on the electronic device 100. The load may include a display device, a processor, etc., for example.

FIG. 2 shows that the USB charger 150 may include a controller 152, a boost voltage regulator (VR) 154, a voltage regulator (VR) 156 and a battery charger 158. Components of the FIG. 2 arrangement may support a buck or boost configuration into the device, and support a buck configuration only out of the device. Other components may also be provided.

The controller 152 may be considered a USB PD controller.

The boost VR 154 may provide a voltage boost to power received via the charge port 20. The battery charger 158 may provide power to the battery 30 and/or the other components 60. The battery charger 158 may receive power from the AC adapter 70, the charge port 20 and/or the boost VR 154. The VR 156 may provide power back to the charge port 20.

The controller 152 may individually control switches 162, 164, 166 so as to appropriately provide an appropriate power path. The switch 32 may be controlled by a controller to provide power to the battery 30.

The controller 152 may determine an operational mode (or function) of the charger 150 based on various factors such as a device coupled to the charge port 20, a voltage at the charge port 20, a voltage at the battery 30 and/or a voltage at the battery port. Based on the determined operational mode, the controller 152 may control any one of the switches 162, 164, 166 and/or voltage regulators 154, 156.

In order to provide the charger 150 in an appropriate operational mode, a plurality of circuits (or circuit blocks) may be used. The circuits (or circuit blocks) may include a plurality of controllers, a plurality of transistors (such as metal-oxide-silicon field effect transistors (MOSFETs)), a plurality of inductors, and a plurality of associated components. This may result in considerable space being used.

Embodiments may provide a bi-directional USB charger, such as a USB buck-boost charger. The bi-directional USB charger may include a single controller, a plurality of transistors (such as 4 MOSFETs) and an inductor, for example. Other components may also be provided. The charger may include logic, at least a portion of which is hardware, to perform operations.

In at least one embodiment, logic (including circuitry) of the electronic device may control a direction of power flow based on a determined operational mode. In at least one arrangement, the direction of power flow may be from the charge port to the battery port. In at least another arrangement, the direction of power flow may be from the battery port to the charge port.

The logic may control power flow between the charge port and the battery port based on the determined operational mode. Logic may also provide power flow along a first path or a second path based on a characteristic at the battery port or at the charge port.

Figure 3:
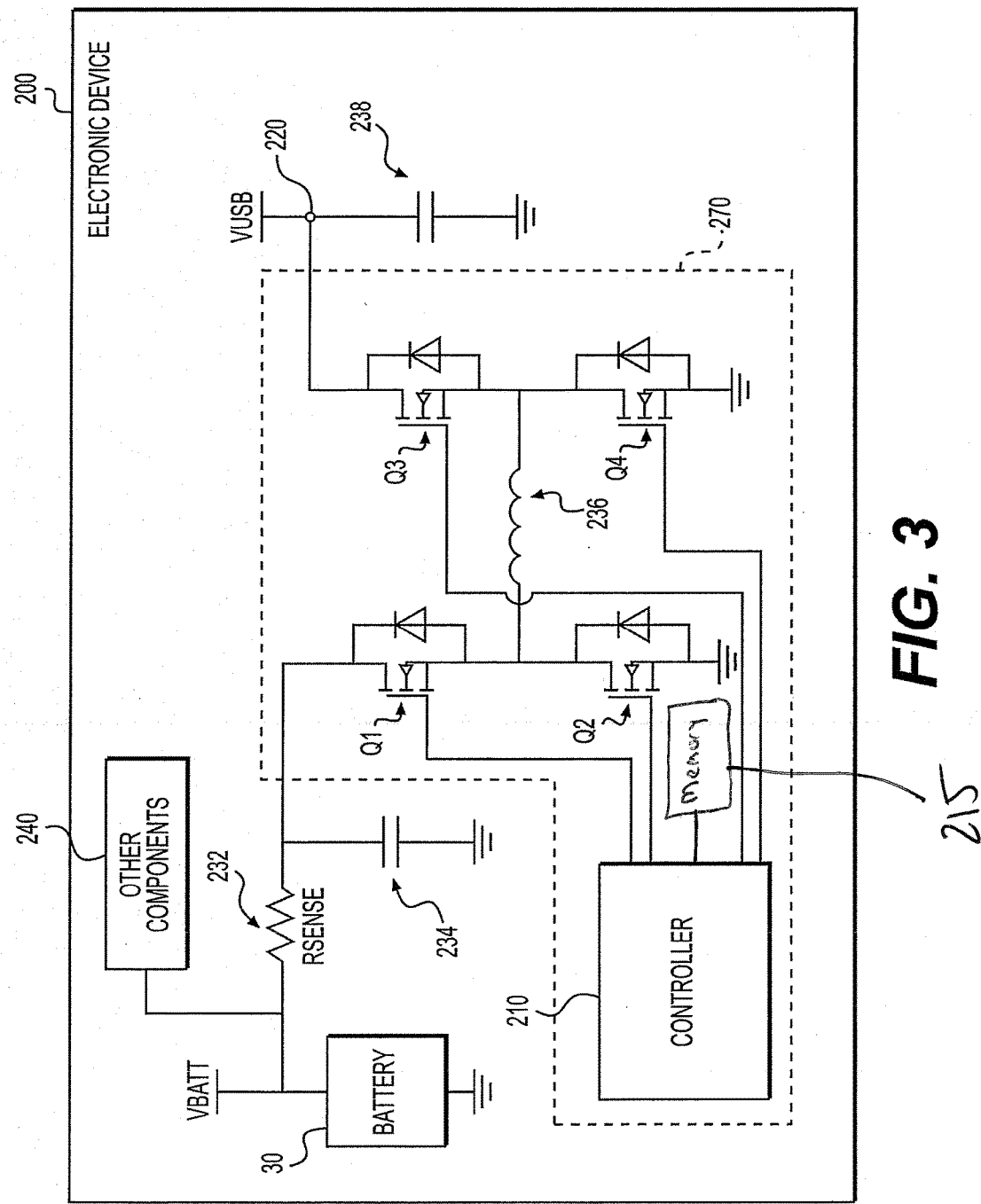
FIG. 3 shows an electronic device according to an example embodiment.

FIG. 3 shows an electronic device according to an example embodiment. Other embodiments and configurations may also be provided.

More specifically, FIG. 3 shows an electronic device 200 having a USB charge port 220, a bi-directional charger 270, the battery 30 and other components 240 (of the electronic device 200). The bi-directional charger 270 may be provided between the battery 30 and the charger port 20 in a similar manner as shown in FIG. 1.

The charger 270 may include a controller 210, a first switch Q1, a second switch Q2, a third switch Q3, a fourth switch Q4. FIG. 3 also shows that the electronic device 200 includes a resistor 232, a first capacitor 234, an inductor 236, and a second capacitor 238.

The AC adapter 70 may also be coupled to at least one component of the electronic device 200.

The other components 240 may include a load of the electronic device 200. The load may include a display device, a processor, etc., for example.

The controller 210 may be USB PD controller, for example.

The controller 210 may provide a separate control signal to each of the switches Q1, Q2, Q3 and Q4. The controller 210 may thereby control the state of each of the switches Q1, Q2, Q3 and Q4. The controller 210 may therefore control an operational mode (or function) of the charger 270 and/or the electronic device 200.

A voltage of the battery 30 or a voltage at the battery port may be represented as Vbatt. A voltage at the charge port 220 may be represented as Vusb.

The battery voltage Vbatt may vary based on a state of charge of the battery 30. The USB voltage Vusb may also change when a different device is plugged into the charge port 220 or is unplugged from the charge port 220.

The controller 210 may determine an appropriate operational mode of the charger 270 (and/or the electronic device 200), and the controller 210 may control components of the charger 200 based on the determined operational mode. The controller 210 may control the switches Q1, Q2, Q3 and Q4 based on the battery voltage Vbatt, the USB voltage Vusb, a type of device coupled to the charger port 220 and/or a desired direction of power flow. The controller 210 may determine an operational mode based at least on a characteristic at the battery port or at the charge port.

The controller 210 may determine the operational mode based at least on a device coupled to the charger 270. The controller 210 may determine the operational mode based at least on a voltage at the battery port.

The controller 210 may determine the type of the USB device that is plugged into the charge port 220 and then determine the mode of operation to be used.

A USB charger may include resistor dividers on D+/D− data lines (of the cable) to communicate a power capability of the charger. A controller may check a voltage level on the data lines (driven by the resistor divider) and determine the power capability of the charger.

A USB PD may use a Frequency Shift Keying (FSK) signal to communicate the power capability and requirement. The FSK signal may ride over the power line or be on a dedicated pin/line depending on the connector. A USB connector (such as a type A or a type B) may use FSK over a power line method. On the other hand, a USB connector may have a dedicated pin. In this example, the controller may read the FSK signal to determine power capability.

With an unknown USB connector plugged into the electronic device, the controller may read the plugged in device in one of the types of methods, and determine the type of device/charger and its power capability.

Five different operational modes of the charger 270 (and/or the electronic device 200) may now be described. Other types of operational modes (or functions) may also be provided. For example, the five operational modes may include: Mode 1) a mode for a battery to power a USB device; Mode 2) a mode for a generic or specific USB charger to charge a battery; Mode 3) a mode for USB PD charging of a battery and a sourcing system; Mode 4) a mode for a battery operation with no USB device being coupled to the electronic device; and Mode 5) a mode for a battery to power a USB PD consumer or receiver.

Depending on the determined operational mode, the switches Q1, Q2, Q3 and Q4 may be controlled by the controller 210 such that the switches Q1, Q2, Q3, Q4 operate according to one of the following methodologies (or operations).

A control FET methodology is when pulse width modulation (PWM) may be controlled based on input/output voltage/current conditions.

A synchronous (sync) diode methodology is when a synchronous rectifier is provided as a free-wheeling diode.

An ON methodology is when a low impedance/loss path is provided for current flow.

An OFF methodology is when a high impedance path is provided to block current flow.

The following are further detail descriptions of the five operation modes. Other operational modes may also be provided.

Mode 1) a Mode for a Battery to Power a USB Device

In Mode 1, the power is to flow from the battery 30 (or battery port) to a USB device coupled to the charge port 220. The controller 210 may provide the components into a Buck converter configuration (i.e., a step down configuration) by: 1) providing the switch Q1 as the control FET; 2) providing the switch Q2 as the sync diode; 3) providing the switch Q3 in an ON state; and 4) providing the switch Q4 in an OFF state.

In Mode 1, the battery 30 may provide power to USB devices such as a mouse, a keyboard, a hard drive etc., or the battery 30 may charge a mobile phone, a mobile terminal or a tablet. The direction of power flow is from the battery 30 (or battery port) to the USB charge port 220. This mode may be provided when the battery voltage Vbatt is greater than a prescribed USB voltage (e.g. 5 volts). Accordingly, the charger 270 may be configured as a buck converter having a constant voltage (CV) by operating the switch Q1 as a pulse width modulate (PWM) controlled FET, and providing the switch Q2 as a synchronous rectifier. The switch Q3 may be turned ON to direct current to the USB output port (i.e., the charge port). The switch Q4 may be turned OFF to avoid shorting to ground.

Mode 2) A Mode for a Generic or Specific USB Charger to Charge A Battery

In Mode 2, the power is to flow from a USB device (at the charge port 220) to the battery 30 (or the battery port). The controller 210 may provide the components into a boost converter configuration (i.e., a step up configuration) by: 1) providing the switch Q1 as the sync diode; 2) providing the switch Q2 as the control FET; 3) providing the switch Q3 in an ON state; and 4) providing the switch Q4 in an OFF state.

In Mode 2, a generic or a brand specific USB charger may be sourcing power to charge the battery 30, such as the battery of a laptop, for example. The direction of power may be flow from the USB charge port 220 to the battery 30 (or battery port). If the USB voltage Vusb is less than the battery voltage Vbatt, then boosting of the voltage may be needed. The charger 270 may be configured as a boost converter having a constant current (CC)/constant voltage (CV) battery charging by operating the switch Q2 as the PWM controlled FET, and operating the switch Q1 as the synchronous rectifier. The switch Q3 may be turned ON to direct current from the USB input port to the inductor 236. The switch Q4 may be turned OFF to avoid shorting to ground.

Mode 3) A Mode for a USB PD Charging of a Battery and A Sourcing System

In Mode 3, the power is to flow from a USB device (at the charge port 220) to the battery 30 (or the battery port). The controller 210 may provide the components into a buck converter configuration (or step down configuration) having a constant current (CC) and a constant voltage (CV) by: 1) providing the switch Q1 in an ON state; 2) providing the switch Q2 in an OFF state; 3) providing the switch Q3 as a control FET; and 4) providing the switch Q4 as the sync diode.

In Mode 3, the USB PD charger may source power to charge the battery 30, such as the battery of a laptop, for example. The direction of power flow may be from the USB charge port 220 to the battery 30 (or battery port). If the USB PD charger voltage Vusb (such as 12V/20V) is greater than the battery voltage Vbatt, then the charger 270 may be configured as a buck converter having a constant current (CC)/constant voltage (CV) battery charging by the switch Q3 as the PWM controlled FET, and the switch Q4 as the synchronous rectifier. The switch Q1 may be turned ON to direct current from the inductor 236 to the battery 30. The switch Q2 may be turned OFF to avoid shorting to ground.

Mode 4) A Mode for a Battery Operation with No USB Devices

In Mode 4, no adapter or USB device is plugged into the electronic device 200. This mode may provide short circuit protection by: 1) providing the switch Q1 in an OFF state; 2) providing the switch Q2 in an OFF state; 3) providing the switch Q3 in an OFF state; and 4) providing the switch Q4 in an OFF state.

In Mode 4, the electronic device 200 may operate based on the battery 30 without any USB device or charger being plugged into the charge port 20. The switches Q1, Q2, Q3, and Q4 may be turned OFF to provide short circuit protection. This may prevent an event, such as a metal object or moisture getting in the USB charge port to short the power and ground.

Mode 5) A Mode for a Battery to Power A USB PD

In Mode 5, the battery 30 may provide power to a USB PD device such as another laptop computer, for example. The controller 210 may provide the charger 270 in a boost configuration (or step up configuration) having constant voltage (CV) by: 1) providing the switch Q1 in an ON state; 2) providing the switch Q2 in an OFF state; 3) providing the switch Q3 as a sync diode; and 4) providing the switch Q4 as a control FET.

In Mode 5, the battery 30 may provide sourcing power to charge another electronic device having a USB PD, such as another laptop. In a phone/tablet platform, where a 1-cell battery may be used, the battery 30 may be sourcing power to the USB port. In either case, the direction of power may be from the battery 30 (or battery port) to the USB charge port 220. Assuming the battery voltage Vbatt is less than the USB voltage Vusb, the charger 270 may be configured as a boost converter having constant voltage (CV) by providing the switch Q4 as the PWM controlled FET, and the switch Q3 as the synchronous rectifier. The switch Q1 may be turned ON to direct current from the inductor 236 to the battery 30. The switch Q2 may be turned OFF to avoid shorting to ground.

Figure 4:
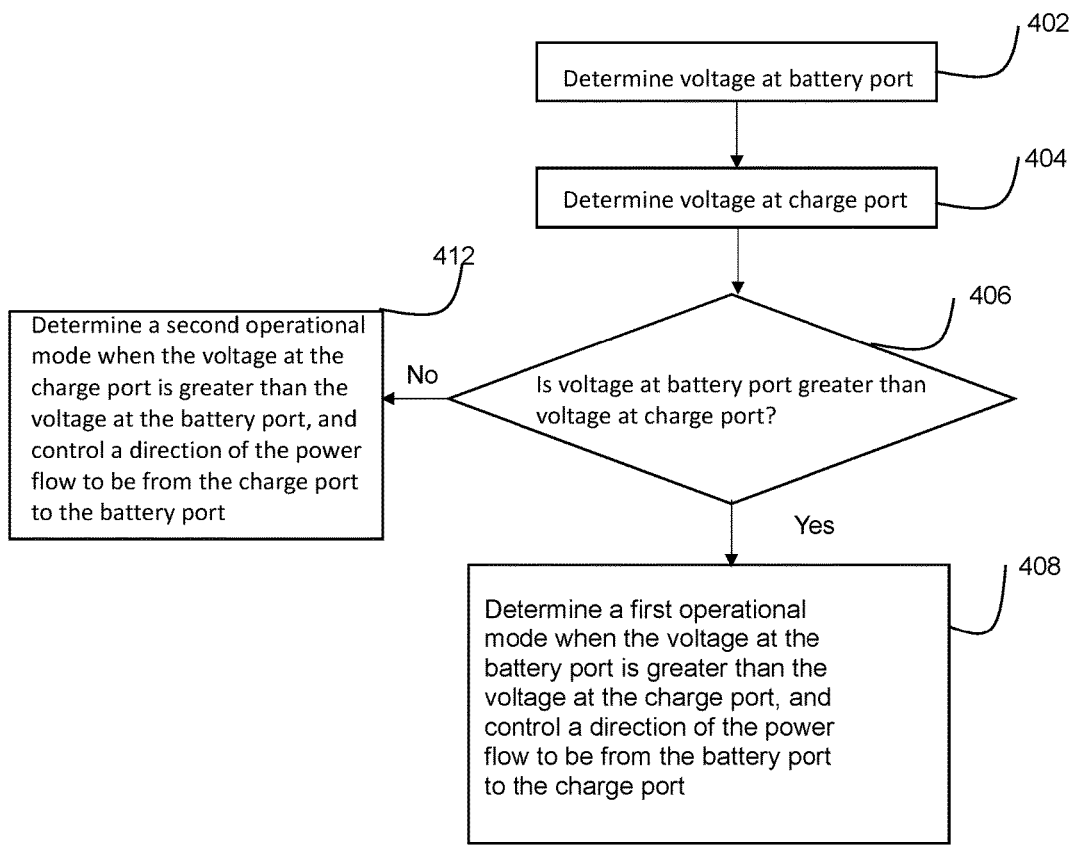
FIG. 4 is a flowchart according to an example embodiment.

FIG. 4 is a flowchart according to an example embodiment. FIG. 4 shows to determine a voltage at a battery port in Operation 402. In Operation 404, a voltage may be determined at a charge port. In operation 406, a determination is made whether a voltage at the battery port is greater than a voltage at the charge port.

If operation 406 determines that the voltage at the battery port is greater than the voltage at the charge port, then the controller may determine that the apparatus is in the first operational mode in operation 408. In addition, the controller may control a direction of the power flow to be from the battery port to the charge port in operation 408.

If operation 406 determines that the voltage at the charge port is greater than the voltage at the battery port, then the controller may determine that the apparatus is in the second operational mode in operation 412. In addition, the controller may control a direction of the power flow to be from the charge port to the battery port in operation 412.

In at least one embodiment, a computer-readable medium may store a program for controlling circuitry (or logic) of the bi-directional charger 270. The circuitry (or logic) may control a power flow between the charge port 220 and the battery 30 (at a battery port). The program may be stored in a system memory, which for example, may be internal or external to the charger 270. In at least one embodiment, the program may be part of a control algorithm for controlling operations of the charger 270.

Instructions or code executed by the controller may be provided to a memory from a machine-accessible medium, or an external storage device accessible via a remote connection (e.g. over a network via an antenna and/or network interface) providing access to one or more electronically-accessible media, etc. A machine-accessible medium may include any mechanism that provides (i.e., stores and/or transmits) information in a form readable by a machine (e.g., a computer). For example, a machine-accessible medium may include random access memory (RAM), read only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions. FIG. 3 shows a memory 215 in the charger 270 to provide instructions ox code to the controller 210. FIG. 3 also shows a computer-readable medium 300 that may store a program for controlling circuitry or logic of the bi-directional charger 270.

The program may include code or instructions to perform any of the operations or functions performed in embodiments previously discussed above.

The following examples pertain to further embodiments.

Example 1 is an apparatus for providing power comprising: logic, at least a portion of which is hardware, to determine an operational mode of a charger based at least on a characteristic at a battery port or a charge port, and to control power flow between the charge port and the battery port based on the determined operational mode.

In Example 2, the subject matter of Example 1 can optionally include that the logic to provide an increase of voltage from the charge port to the battery port based on the determined operational mode.

In Example 3, the subject matter of Example 1 can optionally include that the logic to provide a decrease of voltage from the charge port to the battery port based on the determined operational mode.

In Example 4, the subject matter of Example 1 can optionally include that the logic to determine the operational mode based at least on a voltage at the battery port.

In Example 5, the subject matter of Example 1 can optionally include that the logic to determine the operational mode based at least on a voltage at the charge port.

In Example 6, the subject matter of Example 1 can optionally include that the logic to control the power flow to be from the charge port to the battery port.

In Example 7, the subject matter of Example 1 can optionally include that the logic to control the power flow to be from the battery port to the charge port.

In Example 8, the subject matter of Example 1 can optionally include that the logic to determine the operational mode based on a type of device to couple to the charge port.

In Example 9, the subject matter of Example 1 can optionally include that the charge port is a universal serial bus (USB) charge port.

In Example 10, the subject matter of Example 1 can optionally include that the apparatus includes a plurality of switches to control the power flow.

In Example 11, the subject matter of Example 10 can optionally include that the logic to include a controller to control the power switches.

In Example 12, the subject matter of Example 1 can optionally include that the charger is a bi-directional charger.

Example 13 is an electronic device comprising: a charge port to receive a device, a battery port to receive a battery, and a charger to provide power based at least on a characteristic of a battery to couple to the battery port or a device to couple to the charge port, the charger to include: logic, at least a portion of which is hardware, to provide power flow along a first path or a second path based on the characteristic of the battery or the device.

In Example 14, the subject matter of Example 13 can optionally include that logic to provide an increase of voltage from the charge port to the battery port.

In Example 15, the subject matter of Example 13 can optionally include that the logic to provide a decrease of voltage from the charge port to the battery port.

In Example 16, the subject matter of Example 13 can optionally include that the logic to determine an operational mode based at least on the characteristic at the battery port or at the charge port.

In Example 17, the subject matter of Example 16 can optionally include that the logic to determine the operational mode based at least on a voltage at the battery port.

In Example 18, the subject matter of Example 16 can optionally include that the logic to determine the operational mode based at least on a voltage at the charge port.

In Example 19, the subject matter of Example 13 can optionally include that the first path of power flow is to be from the charge port to the battery port.

In Example 20, the subject matter of Example 13 can optionally include that the second path of power flow is to be from the battery port to the charge port.

In Example 21, the subject matter of Example 13 can optionally include that the logic to determine an operational mode based on a type of the device to couple to the charge port.

In Example 22, the subject matter of Example 13 can optionally include that the charge port is a universal serial bus (USB) port.

In Example 23, the subject matter of Example 13 can optionally include that the charger includes a plurality of switches to control the power flow.

In Example 24, the subject matter of Example 23 can optionally include that the logic to include a controller to control the power switches.

In Example 25, the subject matter of Example 13 can optionally include that the charger is a bi-directional charger.

Example 26 is a charging method of a charger comprising: determining a first operational mode of a charger based at least on a first characteristic at a battery port or a charge port, and controlling a power flow path between the charge port and the battery port based on the determined first operational mode.

In Example 27, the subject matter of Example 26 can optionally include determining a second operational mode of the charger based at least on a second characteristic at the battery port or the charge port, and controlling power flow path between the charge port and the battery port based on the determined second operational mode.

In Example 28, the subject matter of Example 26 can optionally include that the power flow path to provide an increase of voltage from the charge port to the battery port.

In Example 29, the subject matter of Example 26 can optionally include that the power flow path to provide a decrease of voltage from the charge port to the battery port.

In Example 30, the subject matter of Example 26 can optionally include that the first characteristic is a voltage at the battery port.

In Example 31, the subject matter of Example 26 can optionally include that the first characteristic is a voltage at the charge port.

In Example 32, the subject matter of Example 26 can optionally include that the first characteristic is a type of device to couple to the charge port.

In Example 33, the subject matter of Example 26 can optionally include that the power flow path is to be from the charge port to the battery port.

In Example 34, the subject matter of Example 26 can optionally include that the power flow path is to be from the battery port to the charge port.

Example 35 is a computer-readable medium comprising one or more instructions that when executed on a processor to configure the processor to perform one or more operations to: determine a first operational mode of a charger based at least on a first characteristic at a battery port or a charge port, and control power flow path between the charge port and the battery port based on the determined first operational mode.

In Example 36, the subject matter of Example 35 can optionally include that the processor to perform one or more operations to: determine a second operational mode of the charger based at least on a second characteristic at the battery port or the charge port, and control power flow path between the charge port and the battery port based on the determined second operational mode.

In Example 37, the subject matter of Example 35 can optionally include that the power flow path to provide an increase of voltage from the charge port to the battery port.

In Example 38, the subject matter of Example 35 can optionally include that the power flow path to provide a decrease of voltage from the charge port to the battery port.

In Example 39, the subject matter of Example 35 can optionally include that the first characteristic is a voltage at the battery port.

In Example 40, the subject matter of Example 35 can optionally include that the first characteristic is a voltage at the charge port.

In Example 41, the subject matter of Example 35 can optionally include that the first characteristic is a type of device to couple to the charge port.

In Example 42, the subject matter of Example 35 can optionally include that the power flow path is to be from the charge port to the battery port.

In Example 43, the subject matter of Example 35 can optionally include that the power flow path is to be from the battery port to the charge port.

Example 44 is an electronic device comprising: a charge port to receive a device, a battery port to receive a battery, and means for determining an operational mode of a charger based at least on a characteristic at a battery port or a charge port, and for controlling power flow between the charge port and the battery port based on the determined operational mode.

In Example 45, the subject matter of Example 44 can optionally include that the means for controlling further for providing an increase of voltage from the charge port to the battery port based on the determined operational mode.

In Example 46, the subject matter of Example 44 can optionally include that the means for controlling further for providing a decrease of voltage from the charge port to the battery port based on the determined operational mode.

In Example 47, the subject matter of Example 44 can optionally include that the means for determining further for determining the operational mode based at least on a voltage at the battery port.

In Example 48, the subject matter of Example 44 can optionally include that the means for determining to determine the operational mode based at least on a voltage at the charge port.

In Example 49, the subject matter of Example 44 can optionally include that the means for determining to determine the operational mode based on a type of device to couple to the charge port.

In Example 50, the subject matter of Example 44 can optionally include that the means for controlling includes a plurality of switches to control the power flow.

In Example 51, the subject matter of Example 50 can optionally include that the means for controlling includes a controller to control the power switches.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for providing power comprising:
 logic, at least a portion of which is hardware including a non-transitory computer-readable medium comprising one or more instructions that when executed on a processor perform one or more operations, to determine an operational mode of a charger based at least on a voltage at a battery port, a voltage at a charge port, a determination of whether a device is coupled to the charge port, a type of the device, and a power capability of the device, and to control power flow between the charge port and the battery port based on the determined operational mode,
 wherein the logic is to determine that the charger is in a first operational mode when the voltage at the battery port is greater than the voltage at the charge port, and to, based on the determination that the charger is in the first operational mode:
  configure the charger as a buck converter; and
  control a direction of the power flow to be from the battery port to the charge port by operating a first switch as a control switch controlled by pulse width modulation, and a second switch as a synchronous rectifier, wherein the first switch has three terminals, and the second switch has three terminals, and wherein the first switch is between a controller and a power port; the logic is to determine that the charger is in a second operational mode when the voltage at the charge port is less than the voltage at the battery port, and to, based on the determination that the charger is in the second operational mode:
  configure the charger as a boost converter based on the determination that the charger is in the second operational mode; and
  control a direction of the power flow to be from the charge port to the battery port by operating the first switch to be a synchronous rectifier, and the second switch as a control switch controlled by pulse width modulation;
 the logic is to determine that the charger is in a third operational mode when the voltage at the battery port is less than the voltage at the charge port, and the logic is to control the direction of the power flow to be from the charge port to the battery port in a buck converter configuration;
 the logic is to determine that the charger is in a fourth operational mode when the logic is to determine that there is no device coupled to the charge port; and
 the logic is to determine that the charger is in a fifth operational mode when the voltage at the battery port is less than the voltage at the charge port, and the logic is to control the direction of the power flow to be from the battery port to the charge port in a boost configuration with a constant voltage.

2. The apparatus of claim 1, wherein the logic provides an increase of voltage from the charge port to the battery port based on the determined second operational mode.

3. The apparatus of claim 1, wherein the logic provides a decrease of voltage from the charge port to the battery port based on the determined first operational mode.

4. The apparatus of claim 1, wherein the logic controls a third switch between the controller and the battery port to be a rectifier in the first operational mode.

5. The apparatus of claim 1, wherein the logic controls a third switch between the controller and the battery port to be in an OFF state in the second operational mode.

6. The apparatus of claim 1, wherein the power flow to the battery port in the second operational mode is from an alternating current (AC) adapter.

7. The apparatus of claim 1, wherein the apparatus includes a plurality of power switches to control the power flow.

8. The apparatus of claim 7, wherein the logic includes a controller to control the plurality of power switches.

9. An electronic device comprising:
 a charge port to receive a device;
 a battery port to receive a battery; and
 a charger to provide power based at least on a voltage at the battery port, a voltage of a device at the charge port, a determination that the device is coupled to the charge port, a type of the device, and a power capability of the device, the charger to include:
 logic, at least a portion of which is hardware including a non-transitory computer-readable medium comprising one or more instructions that when executed on a processor perform one or more operations, to provide power flow along a first path or a second path based on the voltage at the battery port, the voltage of the device at the charge port, the determination that the device is coupled to the charge port, the type of the device, and the power capability of the device;
 wherein the logic is to determine that the charger is in a first operational mode when the voltage at the battery port is greater than the voltage of the device at the charge port, and to, based on the determination that the charger is in the first operational mode:
 configure the charger as a buck converter; and
 control a direction of the power flow to be from the battery port to the charge port by operating a first switch as a control switch controlled by pulse width modulation, and a second switch as a synchronous rectifier, wherein the first switch has three terminals, and the second switch has three terminals, and wherein the first switch is between a controller and a power port;
 the logic is to determine that the charger is in a second operational mode when the voltage of the device at the charge port is less than the voltage at the battery port, and to, based on the determination that the charger is in the second operational mode:
 configure the charger as a boost converter; and
 control a direction of the power flow to be from the charge port to the battery port by operating the first switch to be a synchronous rectifier, and the second switch as a control switch controlled by pulse width modulation;

the logic is to determine that the charger is in a third operational mode when the voltage at the battery port is less than the voltage at the charge port, and the logic is to control the direction of the power flow to be from the charge port to the battery port in a buck converter configuration;

the logic is to determine that the charger is in a fourth operational mode when the logic is to determine that there is no device coupled to the charge port; and the logic is to determine that the charger is in a fifth operational mode when the voltage at the battery port is less than the voltage at the charge port, and the logic is to control the direction of the power flow to be from the battery port to the charge port in a boost configuration with a constant voltage.

10. The electronic device of claim 9, wherein the logic provides an increase of voltage from the charge port to the battery port.

11. The electronic device of claim 9, wherein the logic provides a decrease of voltage from the charge port to the battery port.

12. The electronic device of claim 9, wherein the logic controls a third switch between the controller and the battery port to be a rectifier in the first operational mode.

13. The electronic device of claim 9, wherein the logic controls a third switch between the controller and the battery port to be in an OFF state in the second operational mode.

14. The electronic device of claim 9, wherein the power flow to the battery port in the second operational mode is from an AC adapter.

15. A non-transitory computer-readable medium comprising one or more instructions that when executed on a processor configure the processor to perform one or more operations to:

determine a first operational mode of a charger based at least on a voltage at a battery port, a voltage at a charge port, whether a device is coupled to the charge port, a type of the device, and a power capability of the device, wherein the first operational mode is when the voltage at the battery port is determined to be greater than the voltage at the charge port;

determine a second operational mode of the charger based at least on the voltage at the battery port and the voltage at the charge port, wherein the second operational mode is when the voltage at the charge port is determined to be less than the voltage at the battery port;

determine a third operational mode of the charger based at least on the voltage at the battery port to be less than the voltage at the charge port;

determine a fourth operational mode of the charger based at least on that there is no device coupled to the charge port;

determine a fifth operational mode of the charger based at least on the voltage at the battery port to be less than the voltage at the charge port;

configure the charger as a buck converter based on the determination that the charger is in the first operational mode, configure the charger as a boost converter based on the determination that the charger is in the second operational mode, configure the charger as a buck converter based on the determination that the charger is in the third operational mode, and configure the charger as a boost configuration with a constant voltage based on the determination that the charger is in the fifth operational mode;

control a direction of a power flow path from the battery port to the charge port based on the determined first operational mode by operating a first switch as a control switch controlled by pulse width modulation, and a second switch as a synchronous rectifier, wherein the first switch has three terminals, and the second switch has three terminals, and wherein the first switch is between a controller and a power port;

control a direction of a power flow path from the charge port to the battery port by operating the first switch to be a synchronous rectifier, and the second switch as a control switch controlled by pulse width modulation, based on the determined second operational mode;

control a direction of a power flow from the charge port to the battery port in the buck converter configuration, based on the determined third operational mode; and control a direction of a power flow from the battery port to the charge port in the boost configuration with a constant voltage, based on the determined fifth operational mode.

16. The non-transitory computer-readable medium of claim 15, wherein the power flow path provides an increase of voltage from the charge port to the battery port.

17. The non-transitory computer-readable medium of claim 15, wherein the power flow path provides a decrease of voltage from the charge port to the battery port.

18. The non-transitory computer-readable medium of claim 15, wherein the power flow path in the first operational mode includes a third switch between the controller and the battery port to be a rectifier.

19. The non-transitory computer-readable medium of claim 15, wherein the power flow path in the second operational mode includes a third switch between the controller and the battery port to be in an OFF state in the second operational mode.

20. The non-transitory computer-readable medium of claim 15, wherein the power flow to the battery port in the second operational mode is from an AC adapter.

21. An apparatus for providing power comprising:

logic, at least a portion of which is hardware including a non-transitory computer-readable medium comprising one or more instructions that when executed on a processor perform one or more operations, to select an operational mode of a charger, from at least three operational modes of the charger based at least on a voltage at a battery port, a voltage at a charge port, a determination that a device is coupled to the charge port, and to control a direction of a power flow to the charge port or to the battery port based on the selected operational mode of the charger from the at least three operational modes of the charger;

wherein the at least three operational modes comprise at least three of the following operational modes of the charger:

the charger is in a first operational mode when the voltage at the battery port is greater than the voltage at the charge port, and the logic is to control the direction of the power flow to be from the battery port to the charge port in a buck converter configuration through a first switch as a control switch controlled by pulse width modulation and a second switch as a synchronous rectifier, wherein the first switch has three terminals, and the second switch has three terminals;

the charger is in a second operational mode when the voltage at the battery port is greater than the voltage at the charge port, and the logic is to control the direction of the power flow to be from the charge port to the battery port in a boost converter configuration through the first switch as a synchronous rectifier and the second switch as a control switch controlled by pulse width modulation;

the charger is in a third operational mode when the voltage at the battery port is less than the voltage at the charge port, and the logic is to control the direction of the power flow to be from the charge port to the battery port in a buck converter configuration;

the charger is in a fourth operational mode when the logic is to determine that there is no device coupled to the charge port; and the charger is in a fifth operational mode when the voltage at the battery port is less than the voltage at the charge port, and the logic is to control the direction of the power flow to be from the battery port to the charge port in a boost configuration with a constant voltage.

22. The apparatus of claim 21, wherein the at least three operational modes comprise the first, the second, the third, the fourth and the fifth operational mode.

* * * * *